United States Patent
Kohlenberg

(10) Patent No.: US 6,325,943 B1
(45) Date of Patent: Dec. 4, 2001

(54) METHOD OF TREATING WATER USING AERATOR AND LEVEL-RESPONSIVE VENT VALVE

(75) Inventor: Larry D. Kohlenberg, Maumee, OH (US)

(73) Assignee: Larry's Water Conditioning, Ltd., Maumee, OH (US)

( * ) Notice: Subject to any disclaimer, the term of this patent is extended or adjusted under 35 U.S.C. 154(b) by 0 days.

(21) Appl. No.: 09/637,819

(22) Filed: Aug. 11, 2000

Related U.S. Application Data

(62) Division of application No. 09/159,455, filed on Sep. 24, 1998, now Pat. No. 6,103,108.

(51) Int. Cl.[7] .............................. B01D 35/01; C02F 1/58; C02F 1/64; C02F 1/74
(52) U.S. Cl. .................... 210/741; 210/744; 210/758; 210/793; 210/807; 210/912; 210/120; 210/121; 137/14
(58) Field of Search ...................... 210/739, 741, 210/744, 749, 750, 758, 794, 791–793, 807, 808, 120, 140, 912, 121; 137/202, 14, 587–588

(56) References Cited

U.S. PATENT DOCUMENTS

| | | |
|---|---|---|
| 858,183 | 6/1907 | Holle . |
| 880,090 | 2/1908 | McMahon . |
| 1,827,583 | 10/1931 | James . |
| 1,964,487 | 6/1934 | Smith . |
| 2,060,557 | 11/1936 | Davis . |
| 2,128,311 | 8/1938 | Mertes . |
| 2,237,882 | 4/1941 | Lawlor et al. . |
| 2,370,772 | 3/1945 | Bowers . |
| 2,379,753 | 7/1945 | Sebald . |
| 2,872,415 | 2/1959 | Schleyer et al. . |
| 2,890,838 | 6/1959 | Janssen . |
| 3,109,453 | * 11/1963 | Lincoln . |
| 3,178,024 | * 4/1965 | Jacuzzi . |
| 3,222,277 | * 12/1965 | Joyce . |
| 3,335,752 | * 8/1967 | Hiers et al. . |
| 3,421,625 | * 1/1969 | Fritz . |
| 3,649,532 | * 3/1972 | McLean . |
| 4,068,681 | * 1/1978 | McNair et al. . |
| 4,116,387 | * 9/1978 | Kremer, Jr. et al. . |
| 4,157,304 | * 6/1979 | Molvar . |
| 4,162,970 | * 7/1979 | Zlokarnik . |
| 4,162,971 | * 7/1979 | Zlokarnik et al. . |
| 4,522,151 | * 6/1985 | Arbisi et al. . |
| 4,526,692 | * 7/1985 | Yohe et al. . |
| 4,534,867 | * 8/1985 | Kreusch et al. . |
| 4,563,782 | 1/1986 | Dijkhuizen . |
| 4,608,163 | 8/1986 | Yohe et al. . |

(List continued on next page.)

Primary Examiner—David A. Simmons
Assistant Examiner—Fred Prince
(74) Attorney, Agent, or Firm—Brinks Hofer Gilson & Lione

(57) ABSTRACT

A water treatment apparatus provides treatment of water to remove, for example, hydrogen sulfide and iron, dissolved or dispersed in ground water. The system is provided with water from a conventional well and pump and includes a venturi-type aerating device which may be supplied air by a compressor. The air and water mixture are supplied to a first aerating tank through a spray nozzle which reduces the aerated water flow to a mist of fine droplets. A draw tube adjacent the bottom of the first tank provides the water to a treatment tank which is partially filled with a chemically active filtration media. The treatment tank is also equipped with a draw tube which draws off the treated water at the bottom of the tank and provides it to a third, deaerating tank wherein the air separates from the water and is purged to the atmosphere. Reduction of hydrogen sulfide content from 30 ppm to less than 5 ppm has been achieved.

19 Claims, 4 Drawing Sheets

U.S. PATENT DOCUMENTS

| | | |
|---|---|---|
| 4,659,463 | 4/1987 | Chandler et al. . |
| 4,828,768 | 5/1989 | Talmor . |
| 4,839,057 | 6/1989 | White . |
| 4,840,753 | 6/1989 | Jungmann et al. . |
| 4,857,184 | 8/1989 | DeLoach . |
| 4,861,352 | 8/1989 | Cheng . |
| 4,867,918 | 9/1989 | Kiyonaga et al. . |
| 4,885,084 | 12/1989 | Doyle . |
| 4,966,692 | 10/1990 | Overy . |
| 4,992,181 | 2/1991 | Siebert . |
| 5,054,423 | 10/1991 | Escobal . |
| 5,061,458 | 10/1991 | Miller . |
| 5,069,796 | 12/1991 | Fox . |
| 5,096,580 | 3/1992 | Auchincloss . |
| 5,096,596 | 3/1992 | Hellenbrand et al. . |
| 5,147,530 | 9/1992 | Chandler et al. . |
| 5,173,092 | 12/1992 | Rudder . |
| 5,292,440 | 3/1994 | Hardison . |
| 5,354,459 | 10/1994 | Smith . |
| 5,460,731 | 10/1995 | St. Pierre . |
| 5,744,040 | 4/1998 | Slates et al. . |
| 6,103,108 * | 8/2000 | Kohlenberg . |

* cited by examiner

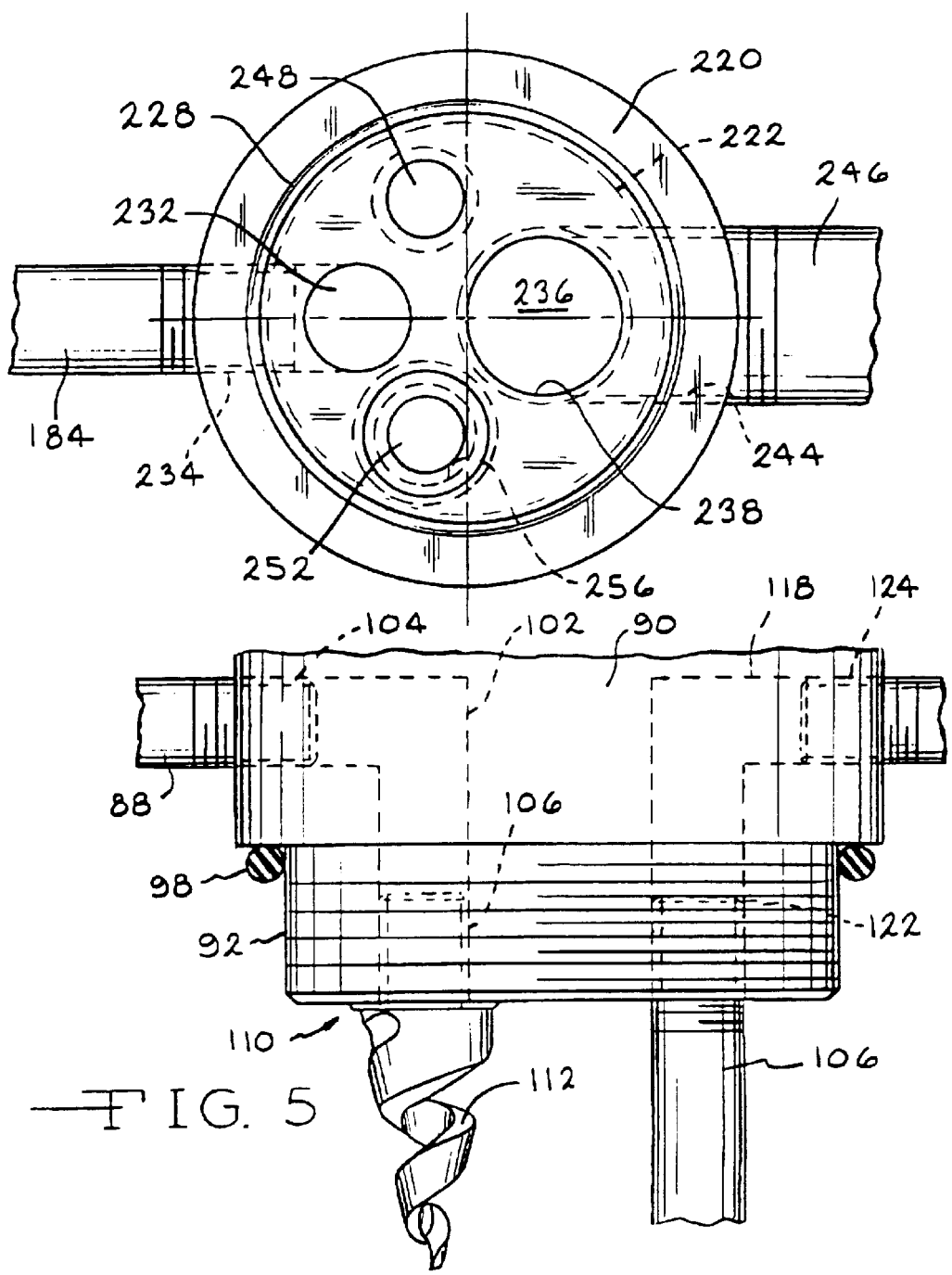

METHOD OF TREATING WATER USING AERATOR AND LEVEL-RESPONSIVE VENT VALVE

CROSS REFERENCE TO CO-PENDING APPLICATION

This is a divisional of application Ser. No. 09/159,455 filed Sept. 24, 1998, now U.S. Pat. No. 6,103,108 granted Aug. 15, 2000.

BACKGROUND OF THE INVENTION

The invention relates generally to an apparatus for treating tap water and more specifically to for removing dissolved contaminants such as hydrogen sulfide ($H_2S$) and iron from water and thereby improve the taste and potability of the water.

Apparatus for removing dissolved hydrogen sulfide and other undesirable dissolved minerals such as iron, is known in the art. For example, U.S. Pat. No. 4,430,228 discloses a process for removing dissolved iron from water utilizing an injector-mixer. The device draws air through a suction inlet into the water flow and includes a diffuser which assists air water mixing. The device also includes a by-pass flow control.

U.S. Pat. No. 5,354,459 to Smith discloses a complex apparatus for removing sulfur compounds from water. The apparatus includes a multiple tank arrangement wherein aeration, contaminant removal and deaeration occur.

U.S. Pat. No. 5,744,040, in which I am an named inventor, Leaches an apparatus and method for removing dissolved hydrogen sulfide from water which includes a unique manifold positioned within an open end of an atomizing tank. The manifold includes a channel in which air and water containing dissolved hydrogen sulfide are mixed.

Given my experience with these and many other water treatment systems, I have concluded that all suffer from certain shortcomings, some more serious than others. For example, some do not provide a necessary level of contaminant removal, others require frequent replacement of the filtration media and still others are overly complex and thus expensive. Accordingly, I have expended further effort to develop improvements in the art of water treatment. The following describes such improvements.

SUMMARY OF THE INVENTION

A water treatment apparatus provides treatment of water to remove, for example, hydrogen sulfide and iron, dissolved or dispersed in ground water. The system is provided with water from a conventional well and pump and includes a venturi-type aerating device which may be supplied air by a compressor. The air and water mixture are supplied to a first aerating tank through a spray nozzle which reduces the aerated water flow to a mist of fine droplets. A draw tube adjacent the bottom of the first tank provides the water to a treatment tank which is partially filled with a chemically active filtration media. The treatment tank is also equipped with a draw tube which draws off the treated water at the bottom of the tank and provides it to a third, deaerating tank wherein the air separates from the water and is purged to the atmosphere. Reduction of hydrogen sulfide content from 30 ppm to less than 5 ppm has been achieved. For increased water flows or removal of greater concentrations of hydrogen sulfide, the tanks may be doubled-up.

Thus, it is an object of the present invention to provide a water treatment system for removing dissolved hydrogen sulfide from water.

It is a further object of the present invention to provide an apparatus for removing hydrogen sulfide and other dissolved minerals such as iron from water.

It is a still further object of the present invention to provide an apparatus for removing hydrogen sulfide and other substances which may imbue the water with color or an unpleasant taste or odor which is simple to install, economical to use and inexpensive.

It is a still further object of the present invention to provide an improved apparatus for removing hydrogen sulfide and other dissolved substances from water which provides improved performance by reducing hydrogen sulfide content from 30 ppm or more to 5 ppm or less.

Further objects and advantages of the present invention will become apparent by reference to the following description of the preferred embodiment and appended drawings wherein like reference numbers refer to the same component, element or feature.

BRIEF DESCRIPTION Of THE DRAWINGS

FIG. 4 is a bottom, plan view of a tank closure for the third, deaerating tank of the present invention;

FIG. 5 is a fragmentary side, elevational view of a tank closure and atomizing nozzle utilized in a first aerating tank of the present invention;

DESCRIPTION OF THE PREFERRED EMBODIMENT

Figure 1:
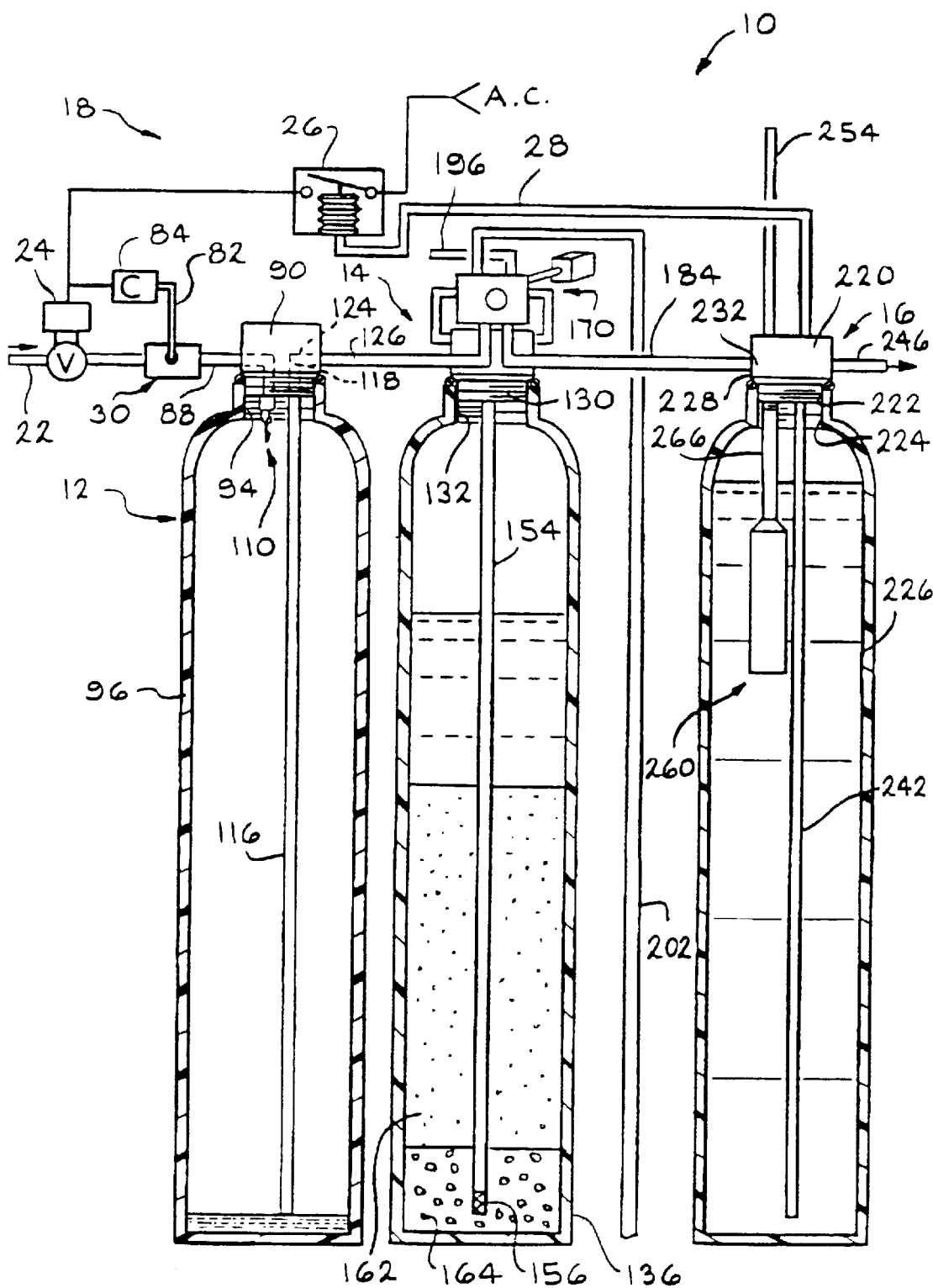
FIG. 1 is a diagrammatic elevational view of water treatment apparatus according to the present invention wherein three water treatment tanks are shown in cross section.

Referring now to FIG. 1, a water treatment apparatus according to the present invention is illustrated and generally designated by the reference number 10.

The apparatus 10 generally includes a plurality of treatment tanks which serially receive and condition tap (potable) water to remove contaminants. The tanks include a first, atomizing or aerating tank assembly 12, a second, treatment tank assembly 14 and a third, daerating tank assembly 16. Each of the tank assemblies 12, 14 and 16 will be described individually below. A control assembly 18 activates and deactivates the apparatus 10 as will also be described below.

The apparatus 10 includes an inlet pipe or conduit 22 which receives water from a conventional water supply system which typically will include a pump and may include a pressurized storage tank (both not illustrated). Water to be treated is supplied to the apparatus 10 through the pipe or conduit 22 at a nominal pressure of 40 to 50 p.s.i., and in any event, in the range of from 30 to 60 p.s.i. A solenoid valve 24 which may be of any construction suitable for water delivery systems operating at the above-recited pressure provide on/off control of the flow of water through the apparatus 10.

The solenoid valve 24 is controlled by a pressure switch 26 which senses the pressure within the third, deaerating tank assembly 16. The pressure switch 26 may be mounted atop the third, dederating tank assembly 16 or, preferably, achieve sensing communication with the interior of the third tank assembly 16 through a short length of pipe or flexible tubing 28. The pressure switch 26 is configured to close on a pressure drop and open on a pressure increase. Although the open and close settings of the pressure switch 26 will necessarily be adjusted to conform with the operating and delivery pressures of the particular water supply system into which the apparatus 10 is installed, satisfactory operation has been achieved in many systems when the pressure switch 26 is adjusted to close at about 30 p.s.i. and open at about 50 p.s.i. It will be appreciated that when the pressure switch 26 closes, the solenoid valve 24 opens and supplies water from the conduit or pipe 22 to the apparatus 10 and when the pressure switch 26 opens, electrical energy to the solenoid valve 24 is terminated and it closes, terminating the flow of water into the treatment apparatus 10.

Figure 2:
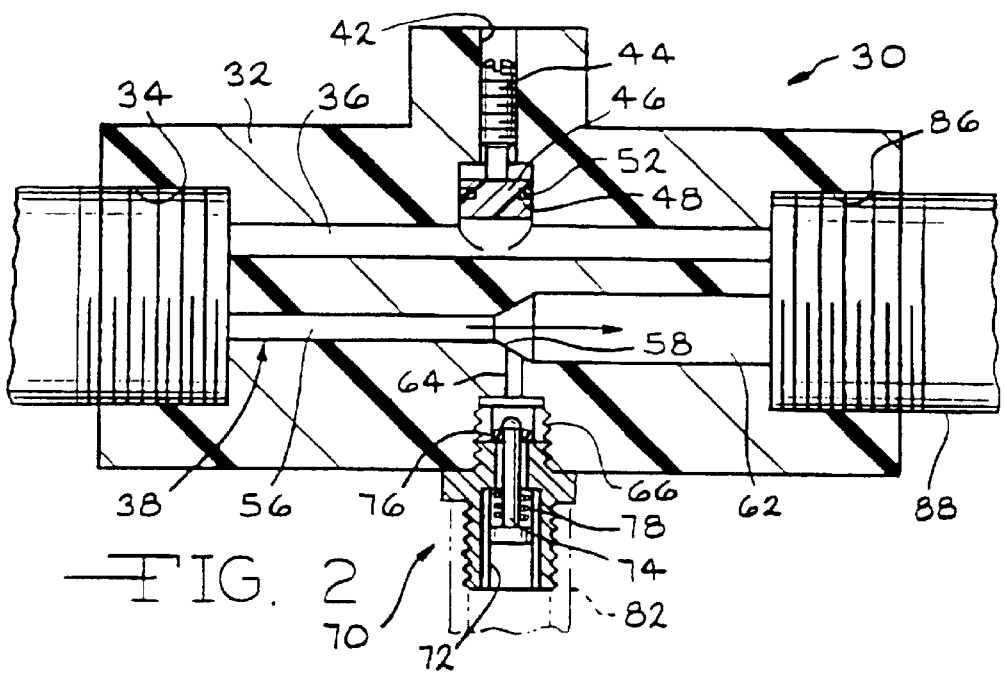
FIG. 2 is a full, sectional view of an air injector assembly incorporated in the present invention.

Referring now to FIGS. 1 and 2, when the solenoid valve 24 is open, water is supplied to an air injector assembly 30. The air injector assembly 30 includes a generally cylindrical housing 32 which defines a threaded inlet passageway 34. Communicating with the threaded inlet passageway 34 is a first, by-pass passageway 36 and a second, air injection passageway 38. Intersecting and extending generally radially from the by-pass passageway 36 is an internally threaded port 42. The port 42 receives a complementary threaded set screw 44 which is aligned with, engages and is connected to a flow control gate or plug 46. Upon clockwise or counter-clockwise rotation, the set screw 44 translates radially inwardly or outwardly, respectively, and advances or retracts the flow control gate or plug 46. Preferably, the flow control plug 46 is circular and includes a peripheral groove 48 which receives an O-ring seal 52 therein. The O-ring 52 engages the housing 32 and provides a fluid-tight seal as will be readily appreciated.

Clockwise rotation of the set screw 44, as noted, advances the plug 46 into the by-pass passageway 36, restricting flow therethrough and vice versa. Increasing restriction of the flow through the by-p)ass passageway 36 thus increases flow through the air injection passageway 38 and vice versa. The appropriate position of the set screw 44 and thus of the plug 46 is that position which provides necessary flow through the air injection passageway 38 to achieve an appropriate quantity per volume of water of injected air to achieve appropriate aeration of the water flowing through the apparatus 10 as will be more fully described below.

As noted, the air injector assembly 30 also includes the second, air injection passageway 38 which define a first smaller diameter region 56, a frusto-conical area 58 wherein the diameter of the air injection passageway 38 increases and a larger diameter region 62. Extending radially from the frusto-conical region 58 is a venturi port 64. The venturi port 64 communicates with a larger threaded region 66 which receives a check valve assembly 70. The check valve assembly 70 includes an axial passageway 72 which receives a plunger 74 which is biased against an O-ring seal 76 by a coil compression spring 78. When water flows through the air injection passageway 38 and specifically the frusto-conical region 66, the pressure is reduced in the venturi port 64 and the atmospheric pressure and, more specifically, the pressure difference between that bearing upon the plunger 14 and within the venturi port 64 drives the plunger 74 open, thereby drawing air through the venturi port 64 into the air injection passageway 38.

Typically, it has been found that while the venturi action of the air injector assembly 30 is significant, it does not provide sufficient injection of air into the water flowing through the air injection passageway 38 to achieve the necessary and desired level of water treatment. Accordingly, pressurized air is supplied to the air injection assembly 30 through a pipe or flexible hose 82. The opposite end of the flexible pipe or hose 82 is connected to the output of and provided with air under pressure by a compressor 84. The compressor 84 is activated when the pressure switch 26 is closed (low pressure) and deactivated when it is open (high pressure), as noted above.

It should be understood that if a source of clean compressed air at about 50 to 55 p.s.i. is available, the compressor 84 may be eliminated and, for example, a solenoid valve (not illustrated) controlled by the pressure switch 26 to provide compressed air to the air injector assembly 30 when the switch 26 is closed may be utilized. The compressor 84 is preferably a diaphragm type pump although any type of air compressor capable of delivering clean, oil free compressed air at a pressure of about 50 to 55 p.s.i. at a volume in the range of generally one to three cubic feet per minute or possibly more depending upon the volume of water to be treated during a given period of time has been found suitable. Again it should be understood that the pressure and flow rates recited herein are those encountered in a typical residential system for treating typically encountered concentrations of contaminants. As noted above, higher flow rates and higher concentrations of contaminants may require additional, i.e., multiple or larger tank assemblies 12, 14 and 16. Additionally, certain installations may operate at higher or lower pressures requiring correspondingly higher or low operating pressures of, for example, the pressure switch 26 and the compressor 84.

Water flow through the air injector assembly 30 and specifically the by-pass passageway 36 and the air injection passageway 38 then recombine at a threaded outlet port 86. A nipple 88 is received within the outlet, port 86 and communicates with a first threaded can or closure 90 disposed upon the first, atomizing or aerating tank assembly 12.

Turning then to FIGS. 1 and 5, the first aerating or atomizing tank assembly 12 includes the cap or closure 90 having exterior or male threads 92 which engage complementary threads 94 on a tank 96. An O-ring seal 98 ensures sealing engagement between the closure 90 and the tank 96. The tank 96 is preferably fiberglass reinforced plastic (FRP) although other materials are also suitable. The cap or closure 90 includes a right angle inlet passageway 102 having a first threaded region 104 into which the nipple 88 or similar fitting is secured. Tho nipple 88 couples the injector assembly 30 to the cap or closure 90. Tire inlet passageway 102 also includes a threaded outlet port 106 which receives an atomizing nozzle 110. The atomizing nozzle 110 includes a depending spiral atomizer 112 against which the water and air mixture impinges. The water and air mixture contacts the spiral atomizer 112 and its kinetic energy breaks the flow into fine droplets or mist. The spiral atomizer 112 preferably sprays a uniform full cone of atomized water and air mixture. The nozzle 110 may be like or similar to the HHSJ series of spray nozzles manufactured and sold under the Spiral Jet trademark. The nozzle 110 may be made of polyvinylohloride.

The interior of the first atomizing or aerating tank 96 is open or vacant, that is, it is not occupied by any media or any flow directing or redirecting elements. Rather, it provides an enclosed space wherein the air, and more particularly the oxygen, which has been injected into the water in the air injector assembly 30 may achieve intimate contact with the hydrogen sulfide, iron and other substances dissolved in the water. That is, it represents a chamber wherein intimate mixing and contact of the oxygen is achieved with the hydrogen sulfide, iron and other contaminants. With regard to the hydrogen sulfide, a sulfate is formed.

A draw tube 116 extends downward from the first cap or closure 90 to within an inch (2.54 cm) of the bottom of the first, aerating tank 96. Water passing through the atomizing nozzle 110 thus falls to the bottom of the first, aerating tank 96 and is collected by the draw tube 116 and flows upwardly out of the first, aerating tank 96. The first closure or cap 90 includes an outlet passageway 118 having a threaded region 122 which receives a complementary threaded portion of the draw tube 116 and also includes a threaded outlet port 104 which receives a nipple 126 which carries the partially treated water to the second, treatment tank assembly 14.

Figure 6:
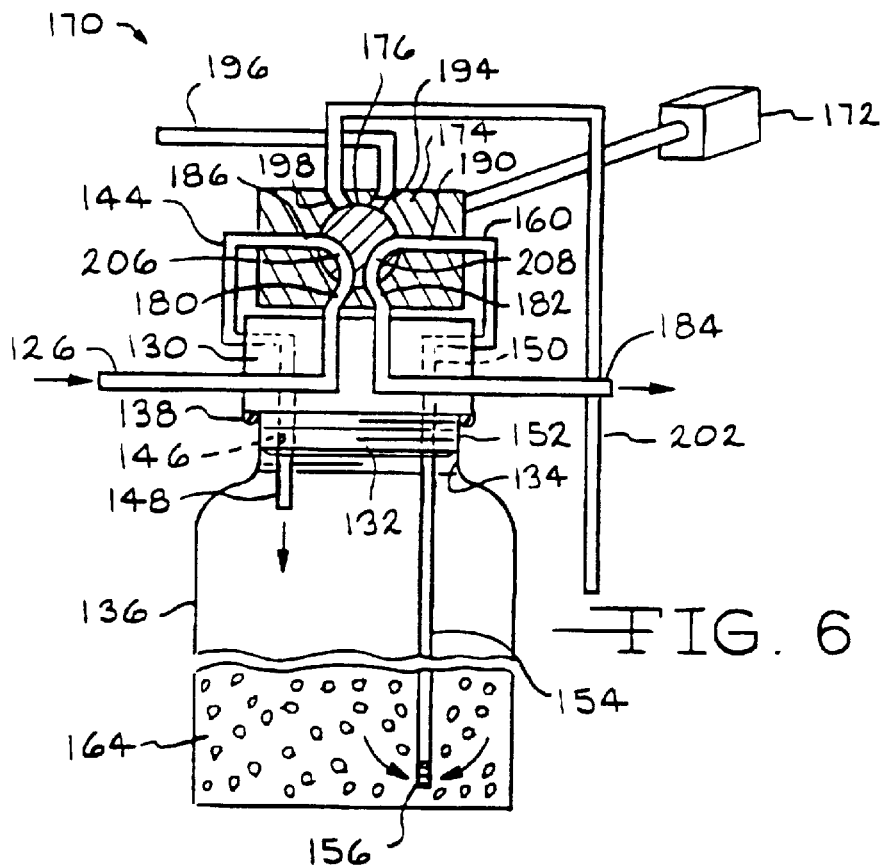
FIG. 6 is a diagrammatic view of the second, treatment tank and operate/regenerate valve assembly in the operate position.
Figure 7:
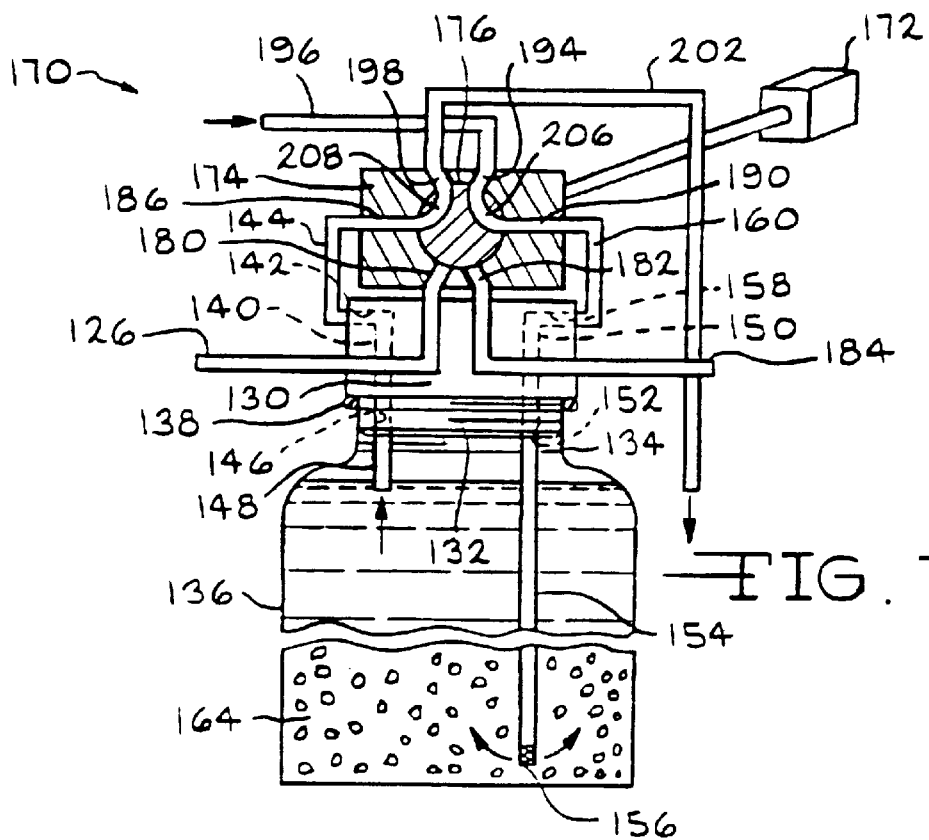
FIG. 7 is a diagrammatic view of the second, treatment tank and operate/regenerate valve assembly in the regenerate position.

Referring now to FIGS. 1, 6 and 7, the second, water treatment tank assembly 14 includes a cap or closure 130 which is identical in all respects to the cap or closure of the first tank assembly 12. That is, it includes external or male threads 132 which are complementary to and engage female threads 134 on the mouth of a second, treatment tank 136. The second, treatment tank is also preferably made of fiberglass reinforced plastic. An O-ring 138 provides a suitable seal between the tank 136 and the closure 130. The second cap or closure 130 includes an inlet passageway 140 having a threaded portion 142 which receives a complementary threaded portion of a nipple 144 and a threaded outlet port 146 which may simply open into the interior of the second treatment tank 136 or receive a short nipple 148. The cap or closure 130 also includes an outlet passageway 150 having a threaded portion 152 which receives a complimentarily threaded end portion of a draw tube 154. At the lower terminus of the draw tube 154 is a slotted riser or sieve screen 156 having openings or passageways preferably smaller than 0.010" which permit the passage of water but inhibit the passage of particulate material. The outlet passageway 150 of the second cap or closure 130 also includes a threaded region 158 which receives an outlet nipple 160.

The middle region of the treatment tank 136 is filled with a treatment media 162 containing manganese dioxide. Many different materials are suitable such as green sand, Pyrolox manufactured by Texas Mining and Minerals or Filox manufactured by the Matt-son Company. Selection of one of the foregoing treatment media 162 or other media containing manganese dioxide will be guided by considerations of optimum performance in view of the specific water contaminant or combination of contaminants to be removed. A lower region of the treatment tank 136 is filled with a coarse media 164 such as No. 8 garnet. The treatment media 162 forms a loose bond with the hydrogen sulfide molecules and the iron and manganese cations and the water exits the second treatment tank through the draw tube 156 substantially free of the targeted contaminants such as hydrogen sulfide and iron.

Associated with the second, treatment tank assembly 14 is an operate/regeriurate control assembly 170 sometimes referred to as a backwash control. The control assembly 170 may be like or similar to the model 163 manufactured by Osmonics/Autotrol Company. The operate/regenerate assembly 170 preferably includes a twenty-four hour timer 172 which controls a multi-port valve 174 having a rotatable or translatable spool or spindle 176. The timer 172 is configured to reposition the spool or spindle 176 from the position illustrated in FIG. 6 to that illustrated in FIG. 7 for a period of time sufficient to regenerate the treatment media 162 during the night or early morning hours when water use is at a minimum. Thus, the timer may be set to activate the valve spool or spindle 176 at 3:00 a.m. and rotate it from the position illustrated in FIG. 6 to that illustrated in FIG. 7 and then, a fixed period of time later, from 15 to 30 minutes, or more or less depending on the system parameters and usages, return the valve spool or spindle 176 to the position illustrated in FIG. 6.

The valve body 174 includes an operating inlet port 180 which is coupled to the nipple 126 from the first, aerating tank assembly 12. Adjacent the operating inlet port 180 is an operating outlet port 182 which is coupled to a nipple 184 which leads to the third, deaerating tank assembly 16. A first tank port 186 communicates with the nipple 144 which is received within the threaded portion 142 of the inlet passageway 140 of the second cap or closure 130. Similarly, the valve body 174 defines a second tank port 190 which is coupled to the threaded portion 158 of the outlet passageway 150 of the second cap or closure 130 by the nipple 160. The valve body 174 further defines a regenerate inlet port 194 Which is in communication with a supply of water through a line 196. Finally, the valve body 174 defines a regenerate outlet port 198 which is in communication with an outlet drain line 202.

When the valve spindle or spool 176 is in the position illustrated in FIG. 6, the flow of aerated water from the nipple 126 enters the operating inlet port 180 and moves through a first passageway 206 in the spindle or spool 116. The passageway connects the port 180 with the port 186 and the aerated water thus moves through the nipple 144, through the inlet passageway 140 and into the interior of the second, treatment tank 136. The aerated water passes through the treatment media 162 where, as noted, the sulfate forms loose bonds with the manganese dioxide treatment media 162. The water then passes through the coarse media 164, through the slotted sieve 156, up the draw tube 154, out the outlet passageway 150, through the nipple 160 and into the second tank port 190. At this time, a second passageway 208 in the spindle or spool 176 connects the second tank port 190 with the operating outlet port 182 and the water flows out the nipple 184.

During the regenerate cycle when the valve spindle or spool 176 has rotated 180°, it is positioned as illustrated in FIG. 1. Now, flow through the nipple 126, the ports 180 and 162 and the nipple 184 is terminated. A flow of water enters the nipple 196, like regenerate inlet port 194, the first passageway 206 and exits the valve body 174 through the second tank port 190 and the nipple 160. This rinse or backwash water then passes through the outlet passageway 150, the draw tube 154, through the coarse media 164 and upward through the treatment media 162. This flow strips the sulfate as well as other contaminants from the treatment media 162 and they flow with the water out the inlet passageway 140, through the nipple 144, through the first tank port 186, through the second passageway 208 in the valvo spindle or spool 116, through the regenerate outlet port 198 and out the drain line 202. Thus, it will be apparent that depending upon the position of the valve spindle or spool 176, the assembly 170 fully and automatically selects either the operate mode of the water treatment apparatus 10 as illustrated in FIG. 6 or the regenerate or backwash mode of the water treatment apparatus 10 as illustrated in FIG. 7. It may also be desirable to provide a third, purge mode of operation which comprehends providing a short period of downward (operating) flow through the treatment media 162 and coarse media 164 which is then provided to the drain line 202 to completely clear the second, treatment tank 136 of all backwash water.

Referring now to FIGS. 1 and 4, the third, deaerting tank assembly 16 will now be described. The third, deaerating tank assembly 16 includes a third cap or closure 220 having a threaded portion 222 which is received within a complementary threaded portion 224 of a third tank 226. The third tank 226 is also preferably made of fiberglass reinforced plastic. An O-ring seal 228 achieves a seal between these components. The third cap or closure 220 includes an inlet port or passageway 232 having threads 234 which are complementary configured and receive the threads on the end of the nipple 184. The inlet passageway 232 communicates with the interior of the third deaseratiing tank 226. An outlet passageway 236 includes a threaded region 238 which receives the threaded terminal portion of a draw tube 242. The draw tube 242 extends approximately to the bottom of the interior of the third, deaerating tank 226. The outlet passage 236 also includes a threaded region 244 into which is received a complementary threaded end portion or a tube or pipe 246 which delivers treated water to the home or building water distribution system (not illustrated). The third cap or closure 220 also includes a through passageway or pressure port 248 which provides communication between the interior of the third, deaerating tank 226 and the pressure switch 26 through the pipe or tubing 28. Thus, it will be appreciated that the pressure switch 26 monitors, on a continuous basis, the pressure within the third tank 226.

Lastly, the third cap or closure 220 on the deaerating tank assembly 16 includes a vent port 252. Preferably, a small, typically flexible, vent line or tube 254 will be utilized and it extend from the vent port 252 to the exterior of the home or building such that any unpleasant odors are released outside rather than inside the building. Disposed within the interior of the third tank 226 and installed in a threaded region 256 of the vent port 252 is a vent control assembly 260.

Figure 3:
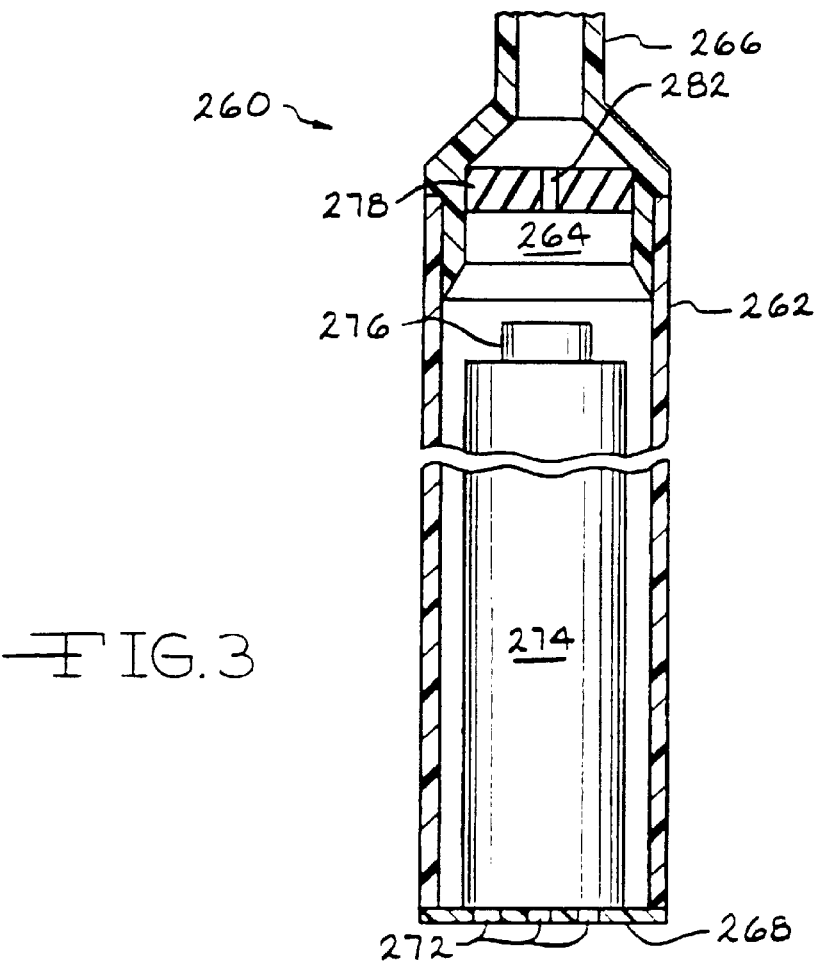
FIG. 3 is a full, sectional view of a vent control valve disposed in a third, deaerating tank of the present invention.

Referring now to FIGS. 1 and 3, the vent control assembly 260 includes a cylindrical housing 262 which defines an open interior region 264 in communication with the vent port 252 through a nipple 266 or tube preferably Integrally formed with the vent control assembly 260. At the lower terminus of the body 262 is a stop or plate 268 having a plurality of through apertures 272. The apertures 272 provide communication between the interior of the tank 26 and the interior 264 of the body 262. Disposed within the interior 264 is a cylindrical float 274. The float 274 is buoyant in water and as water rises and falls in the interior of the tank 226, the apertures 272 allow water to rise and fall within the interior 264 of the body 262. The float 274 includes a resilient valve plug or piston 276 at its upper terminus. A baffle 278 extends across an upper portion of the chamber 264 and define a single through passageway 288 having a diameter of less than about 0.01625 inch and preferably about 0.010 inch. It will thus be readily appreciated that as the float 274 is raised within the internal chamber 264 such that the valve plug 276 engages the baffle 278, the passageway 282 is closed. Contrariwise, when the water level within the interior of the third deaerating tank 226 drop sufficiently, the float 274 falls and the port or passageway 282 is opened, thereby allowing air to escape from the interior of the third tank 226 and maintain a desired balance between the volume of the third tank 226 occupied by air and the volume of the third tank 226 occupied by water.

The foregoing disclosure is the best mode devised by the inventor for practicing this invention. It is apparent, however, that apparatus incorporating modifications and variations will be obvious to one skilled in the art of water treatment. Inasmuch as the so foregoing disclosure presenting the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:
1. A method of water treatment comprising the steps of:
   providing a first tank, atomizing an air and water mixture under pressure in said first tank and recovering water from said first tank,
   providing a second tank containing water treatment media, passing such recovered, atomized water though said water treatment media and recovering such treated water,
   providing a third tank having an air release valve,
   providing such recovered, treated water to said third tank, releasing air through said air release valve upon a fall of water level in said tank and inhibiting air release through said air release valve upon a rise of water level within said third tank.

2. The method of water treatment of claim 1 further including the step of mixing water and compressed air to form said air and water mixture.

3. The method of water treatment of claim 1 further including the steps of providing an air compressor to provide such air and activating said air compressor upon a pressure drop in said third tank and deactivating said air compressor upon a pressure rise in said third tank.

4. The method of water treatment of claim 1 further including the step of back washing said water treatment media.

5. The method of water treatment of claim 1 further including the steps of providing a source of compressed air and mixing such compressed air with water to form such air and water mixture.

6. The method of water treatment of claim 1 further including the step of providing an air injector to provide such air and water mixture.

7. The method of water treatment of claim 1 wherein said water treatment media includes manganese dioxide.

8. A method of treating water comprising the steps of
   providing an air and water mixture under pressure,
   providing a first tank and atomizing such air and water mixture in said first tank,
   providing a second tank containing water treatment media,
   providing atomized water recovered from said first tank to said second tank and passing such recovered water through said water treatment media,
   providing a third tank having an air release valve,
   providing treated water recovered from said second tank to said third tank, and
   releasing air though said air release valve upon a fall of such treated water level within said third tank and inhibiting air release through said air release through said third tank whereby air volume in said third tank is maintained by said air release valve.

9. The method of treating water of claim 8 wherein said air release valve releases air to an atmosphere.

10. The method of treating water of claim 8 wherein said water treatment media includes manganese dioxide.

11. The method of treating water of claim 8 further including a source of compressed air to provide such air and water mixture.

12. The method of treating water of claim 11 further including the step of activating said source of compressed air upon a decrease of pressure in said third tank and deactivating said source of compressed air upon an increase in pressure in said third tank.

13. The method of water treatment of claim 11 further including the step of providing an air injector to provide such air and water mixture.

14. A method of water treatment comprising the steps of:

providing a flow of water under pressure, providing a flow or air under pressure, mixing said flows of air and water to provide a flow of aerated water, atomizing such aerated water under pressure, passing such aerated and atomized water through a water treatment media, providing such treated water to a dearation tank and releasing air from such tank when a level of water falls to a lower level and inhibiting air release when the level of water rises to a higher level.

15. The method of water treatment of claim 14 wherein said water treatment media removes iron.

16. The method of water treatment of claim 14 wherein said water treatment media removed hydrogen sulfide.

17. The method of treating water of claim 14 further including the step of back washing said water treatment media.

18. The method of treating water of claim 14 wherein said water treatment media includes manganese dioxide.

19. The method of treating water of claim 14 further including the step of providing a source of compressed air to provide such air flow of air under pressure and activating said source of compressed air upon a pressure drop in said deaeration tank and deactivating said source of compressed air upon a pressure rise in said third tank.

* * * * *